Morris M. Birnbaum
Phil M. Salomon
INVENTORS.
BY.

GOLOVE & KLEINBERG,
ATTORNEYS.

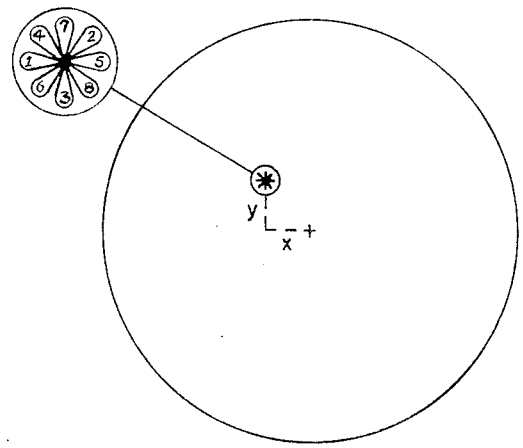
Fig. 3.
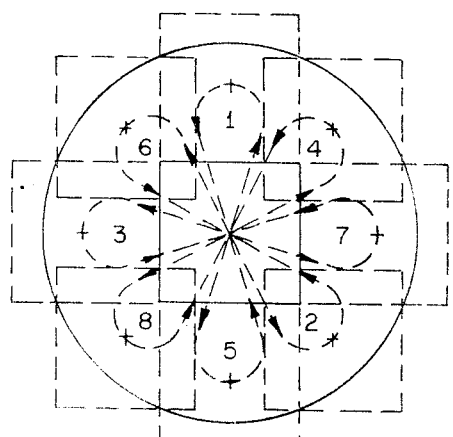
Fig. 4.
Fig. 5a.
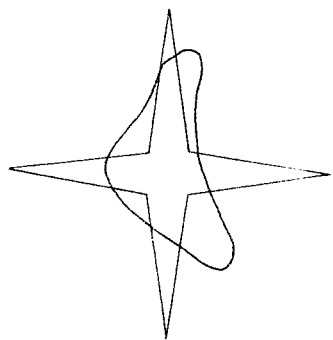
Fig. 5b.
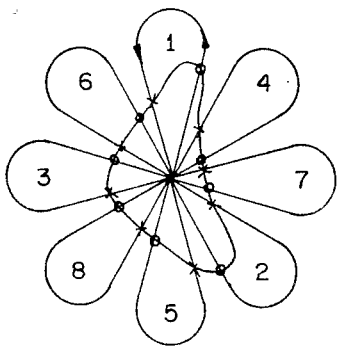

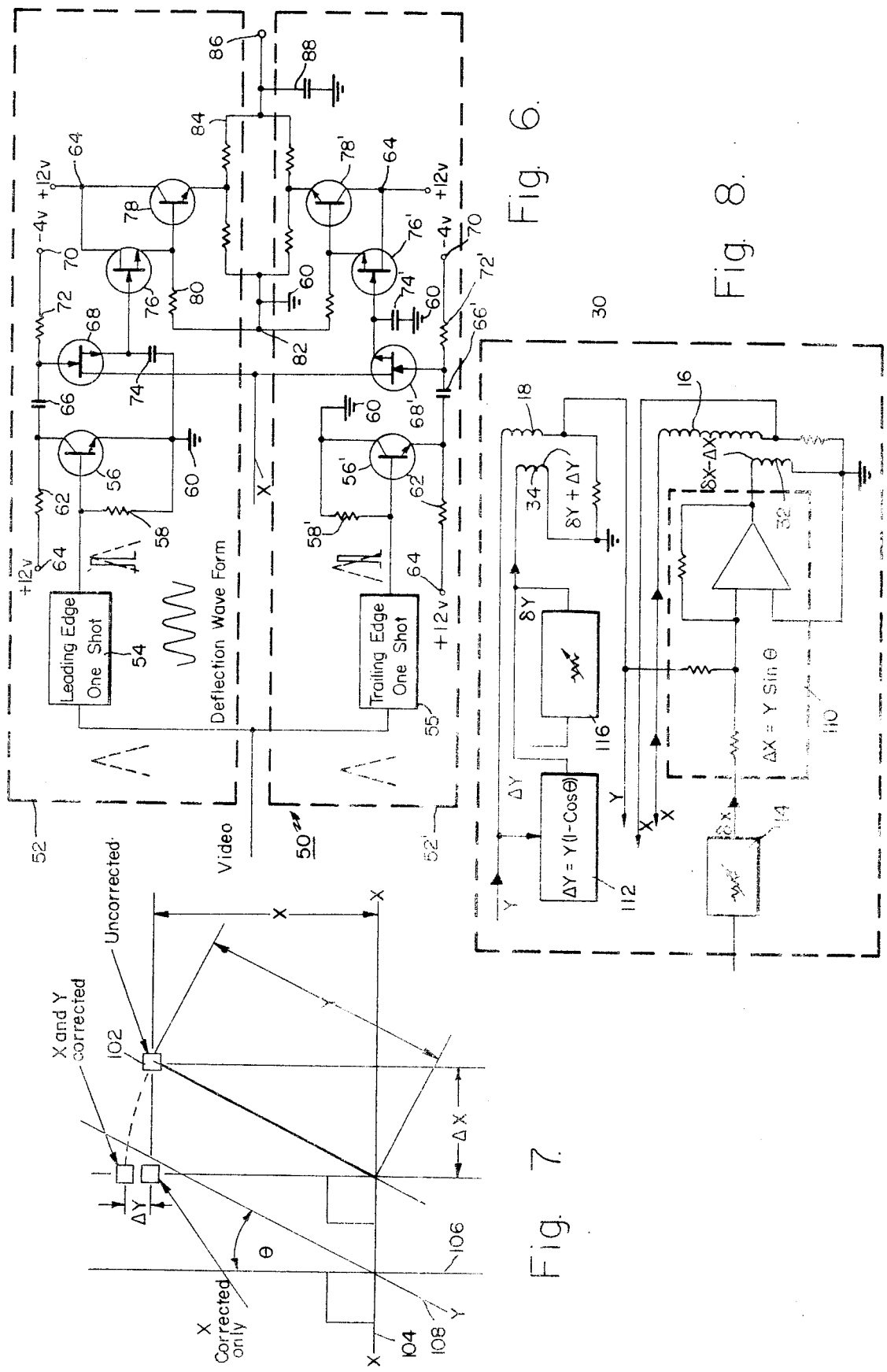

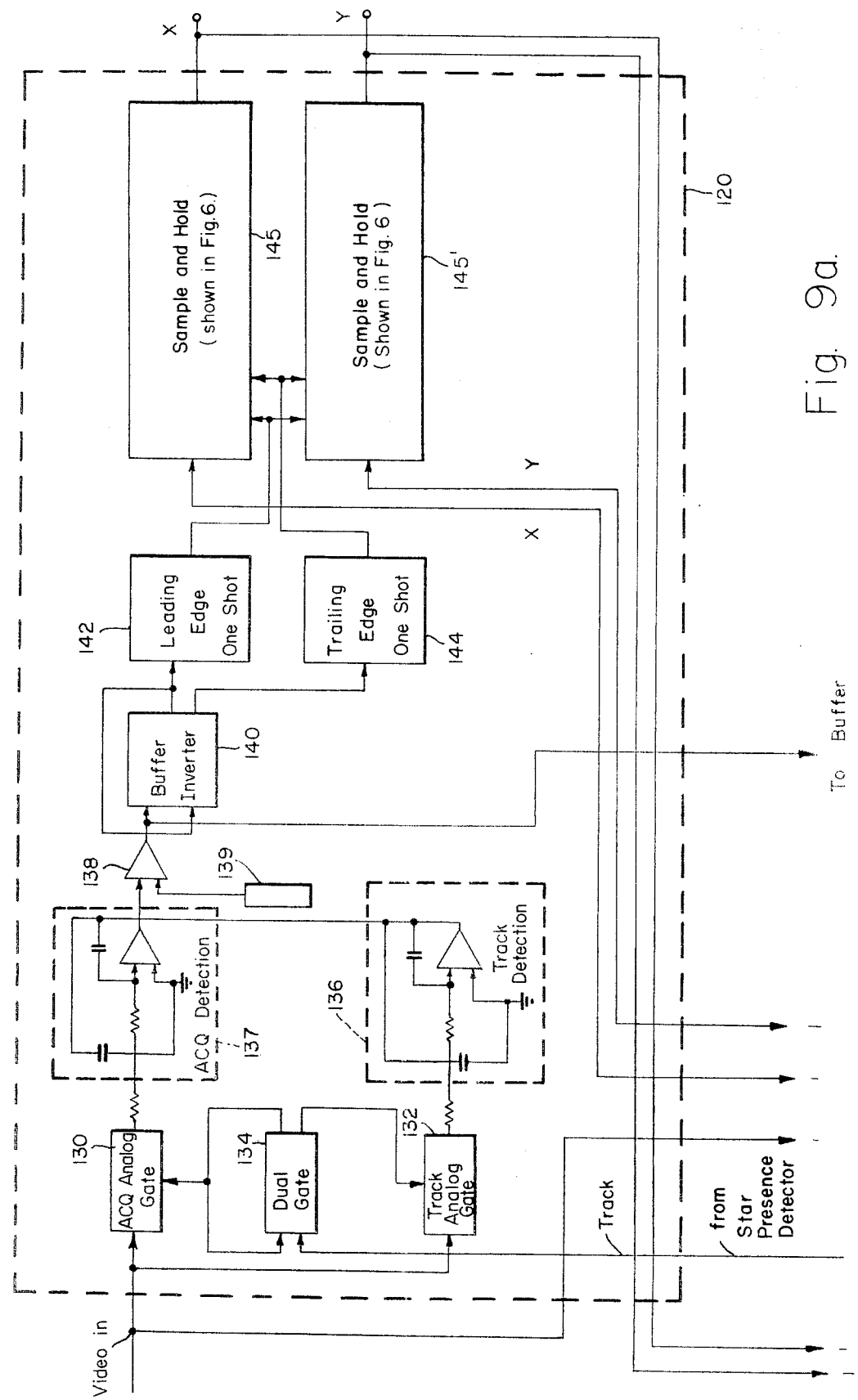

3,513,318
Patented May 19, 1970

3,513,318
OBJECT LOCATING SYSTEM USING IMAGE CENTROID MEASUREMENT
Morris M. Birnbaum, Pasadena, and Phil M. Salomon, Tujunga, Calif., assignors to Hycon Mfg. Company, Monrovia, Calif.
Filed May 1, 1968, Ser. No. 725,699
Int. Cl. G01j 1/20
U.S. Cl. 250—214                                    18 Claims

ABSTRACT OF THE DISCLOSURE

In an object locating system, the signals representing location are sampled at the "leading edge" of an object representing signal and again at the trailing edge of the same object representing signal. The two sets of location representing signals are "averaged" to provide a representation of the location of the centroid of the object. When used in combination with an imaging sensor, the accuracy of the location representing signals is improved by correcting for non-orthogonality of deflecting circuits and for misalignments of the optical axis relative to a deflection "null" axis.

---

The present invention relates to apparatus for the detection of objects emitting or reflecting actinic radiation and for a determination of the location of such objects relative to a predetermined axis, or, alternatively, for locating such objects relative to a predetermined axis.

In prior art systems, such as described and shown in the book "Startrackers and Systems Design" by Quasius and McCanless, published in 1966, by McMillan & Company and as described and shown in the patents to Hulett, No. 3,053,984; Clark, No. 3,149,235; and Birnbaum et al., No. 3,240,942; an actinic image is initially collected through an optical system. Subsequently, an electronic system provides signals representative of the location of the image, relative to a predetermined frame of reference. The signals can then be used in various servo applications which either move the image or move the system.

As discussed in the section on Imaging Sensors in Quasius and McCanless, above, by the use of electro-optical means such as an image dissector tube, an image orthicon tube or a vidicon camera tube, a "field of view" or "window" can be "scanned" and objects "located" therein with respect to the window and a predetermined optical axis. These various electro optical systems may be generally described as "imaging trackers," in which electromagnetic energy is applied to appropriate deflection circuits so that each discrete area of an image plane can be effectively "scanned" to determine the presence or abscence of an actinic radiant image produced by the optical system. In such "imaging trackers" the image or beam deflection signals are electrical analogs of image coordinates in a predetermined reference system with respect to a given point at the image plane.

In prior art systems, two modes of operation were employed. In the first or "acquistion" mode a fairly wide area is scanned. The deflections signalled at the instant of intercept are utilized to represent the location of the object and the sysetm is then switched to a second or "tracking mode." A second or "tracking" scan pattern is generated which is centered on the signalled location. A substantially smaller image area is "scanned" for the purposes of following the image, once located. For highest accuracy, the effective "aperture" or "window" size should be as small as possible. Accordingly, the selection of an appropriate tracking scan becomes important.

In prior art systems, the tracking scan has usually involved a "sweeping" of the image in a predetermined pattern in which the presence and absence of the object image generated pulse signals that, when the image was "centerd," were symmetrical with respect to orthogonal axes intersecting at the optical center. Deviations of the image from the center produced asymmetries, which, when integrated, resulted in D.C. error signals representing displacements from the center which could then be used in servo loops to either relocate the center of the tracking scan pattern or relocate, in space, the predetermined axis of the optical system, or both.

A further problem has been encountered in prior art imaging trackers which resulted from the geometry of the deflection circuits. It has been extremely difficult if not impossible, to build perfectly orthogonal deflection systems for the imaging tracker. Conventionally, using mass production techniques, non-orthogonality can be held to within ±1°, and, with special, custom procurements, non-orthogonality can be ±0.5°. Assuming a ±1° non-orthogonality, a 0.5° displacement in one axis causes a 15.5 arc-second displacement in the other axis. To obtain true orthogonality, corrective electronic circuits must be added in the system. Further, it is possible that the electrical null center, due to non-uniform aging or changing of components, may not lie on the system's optical axis and accordingly, it may be desirable to provide an electrical correction whereby coincidence can be achieved.

According to the present invention, the tracking scan is utilized for the provision of error and correcting signals by instantaneously sampling the deflection signals both at the instant of image intercept or at the "leading edge" of the video output signal representing the object image and, at the instant of image loss or a the "trailing edge" of the video output signal. Two sample and hold networks retain these deflection signals which are applied through an "averaging" network to provide a control signal representative of the assumed image center. This value constantly updates the previously stored deflection signals representing the location of the image and which defines the center of the tracking scan pattern. Successive image intercepts are sampled and stored to continuously provide a representation of image location. At all times, the signal samples are deflection signals which represent the "correct" object location and which therefore "update" the stored deflection signals with successive cycles of the scan pattern. Once the object has been "located," image aberrations, flare, non-circular object images or other irregularities have only a slight effect since the pattern tends to select a central point at the "center" of the image.

Further, a smaller "aperture" may be utilized in the tracking mode and therefore a higher signal-to-noise ratio is available. In a preferred embodiment the X and Y servo error signals are generated simultaneously to control tracking. These error signals are generated by sampling and holding the instantaneous voltage or current values of the deflection circuits at the instant of object detection and the instant of object image loss. Since the signals obtained in this fashion are directly related to the instantaneous position of the target object "leading" and "trailing" edges, a Cartesian set of error signals is generated which defines the object's position relative to a predeterminted axis. These error signals are independent of the scan pattern, and of any distortions that may be present. Further, the error signals directly represent the resolved components of an "error vector" from the "null" axis to the target-object position.

This arrangement permits tracking of objects that are on the optical axis as well as objects that are "off" the optical axis, and are displaced from that axis. Accordingly, the error signal can be used alternatively to locate the object relative to the optical axis or to redirect, by controlling the orientation of the system, the optical axis until it is centered on the object.

A simple sweep pattern was disclosed in U.S. Pat. No. 3,175,121, for generating predetermined patterns on the face of a cathode ray tube. These patterns have been found to be useful as scanning patterns in the present invention. That is, the rosette pattern described and disclosed has many advantages as a scanning pattern in the present invention, and is simply and easily generated utilizing substantially digital circuits. An X axis deflection is generated according to the equation:

$$A \cos 2\pi ft \sin n2\pi ft \qquad (1)$$

The Y axis deflection is represented by:

$$A \sin 2\pi ft \sin n2\pi ft \qquad (2)$$

In these equations, A determines the diameter of the rosette; $f$ represents the number of rosettes to be generated per second; and $n$ determines the number of petals in each rosette. At all times, both X and Y deflection signals are available during the scan generation and, the deflections may be done simultaneously, rather than sequentially as with the cruciform pattern of other prior art devices.

The problem of non-orthogonality can be treated in alternative ways, according to the present invention. In a preferred embodiment, auxiliary deflection circuits are physically added to the existing deflection circuits and are driven independently of the main deflection circuits. Once the actual amount of non-orthogonality is determined, appropriate X and Y D.C. bias signals can be applied to the auxiliary deflecting circuits. The main deflecting circuits are then operable to apply truly orthogonal deflection forces.

In an alternative embodiment, the deflection signals are applied to a compensating circuit which performs a "mathematical correction" that is related to a predetermined function of the angle of non-orthogonality, to produce "true" X and Y output signals in addition to the above mentioned X and Y deflection signals.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 3 is a representation of a tracking scan pattern in the form of a smaller rosette;

FIG. 4 is a diagram of a tracking scan rosette utilizing a square aperture;

Figure 1:
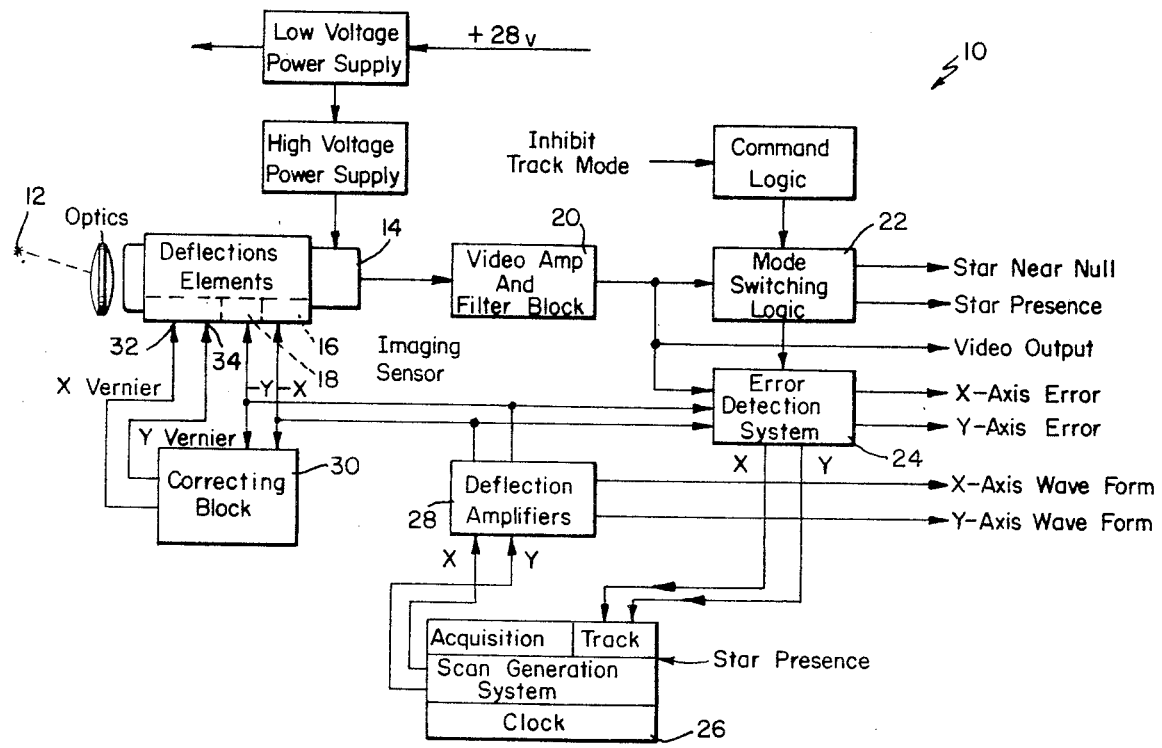
FIG. 1 is a block diagram of an emitting or reflecting system for detecting and locating objects emitting or reflecting actinic radiation.
Figure 9B:
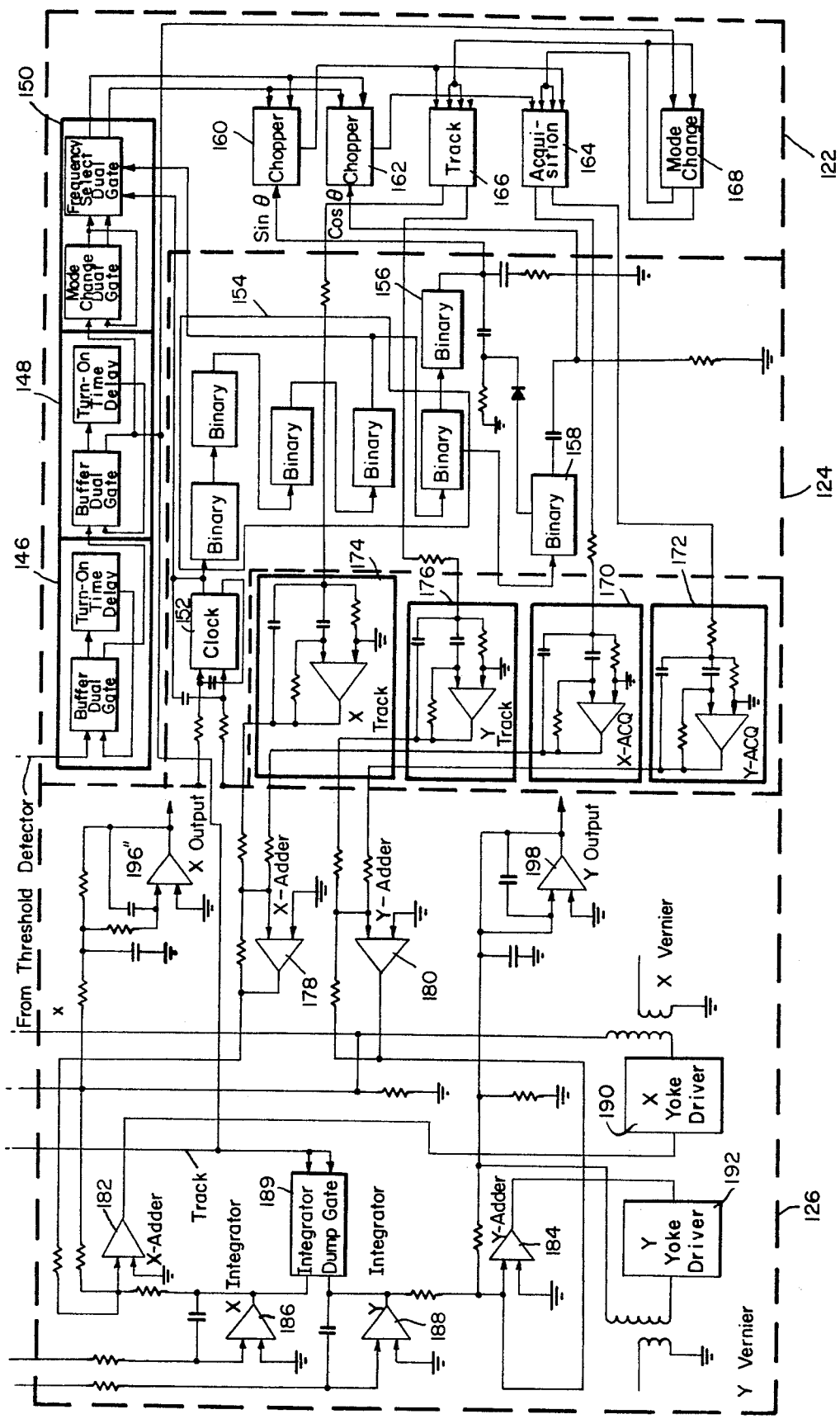
Figure 10:
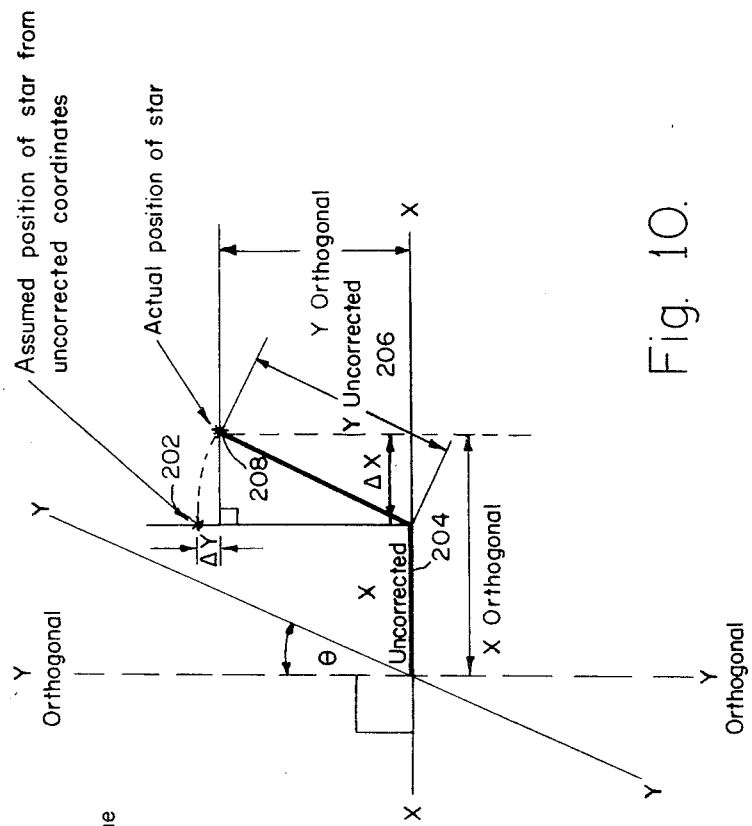
Figure 11:
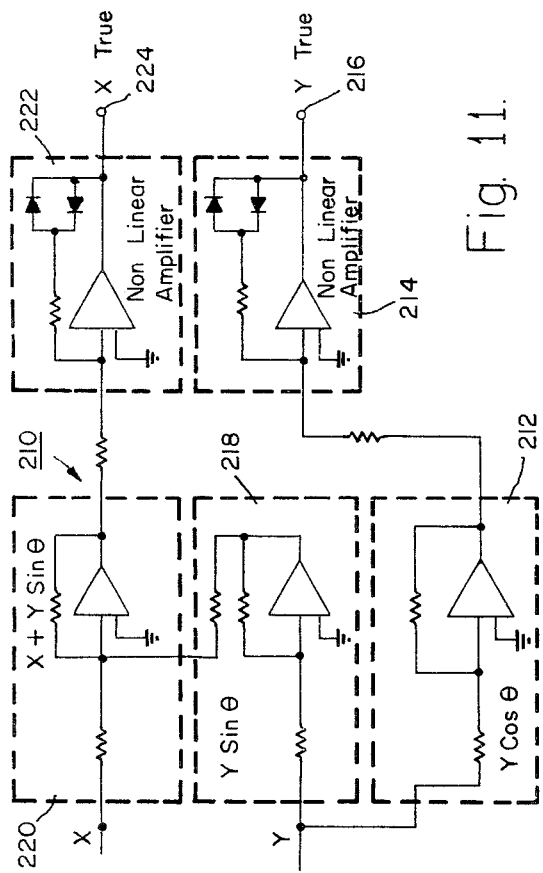
Figure 12:
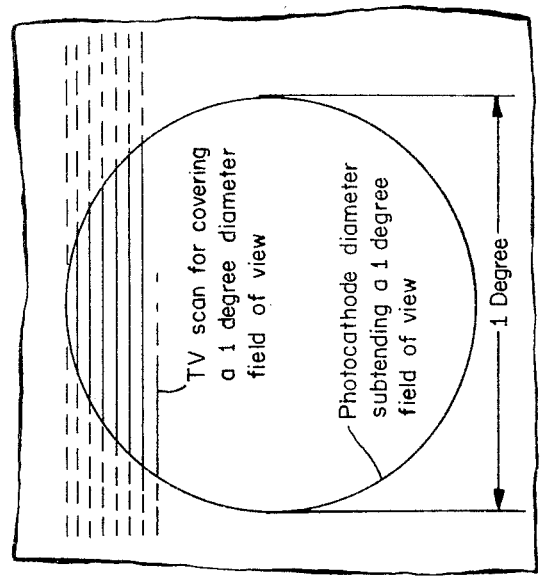

FIG. 5, which includes FIGS. 5a and 5b, are representations of aberrated star images, in which FIG. 5a is an "X–Y" scan of the image and FIG. 5b is a rosette scan of the same image;

FIG. 6 is a circuit diagram of Error Detection and Sample and Hold circuit, useful in the present invention;

FIG. 7 is a diagram, from which the extent of non-orthogonality can be determined;

FIG. 8 is a partially block, partially circuit diagram of non-orthogonality correction circuits;

FIG. 9, which include FIGS. 9a and 9b, is a block diagram in greater detail of the object detecting system of FIG. 1;

FIG. 10 is a geometric diagram, illustrating the correction for non-orthogonality in an alternative embodiment of an object detecting system;

FIG. 11 is a diagram, partially circuit, partially block of circuitry to correct for non-orthtogonality; and FIG. 12 is a representation of an alternative acquisition scan, of the TV-raster type.

FIG. 1 is a block diagram of an object detecting system which, in a preferred embodiment, may be a star-tracker. As shown in FIG. 1, a system 10 is adapted to detect and track a source of emitted or reflected actinic radiation, such as a star 12, using an imaging sensor 14. The imaging sensor 14 is an electro optical transducer and may be a vidicon tube or any other known imaging device. The imaging sensor 14 has, associated with it, sets of deflection elements orthogonally arranged as an X deflection assembly 16 and a Y deflection assembly 18. The output of the sensor 14 is applied to a Video Amplifier and Filter block 20 which, in turn, is connected to a Mode Switching Logic Block 22 and an Error Detection System 24.

The Mode Switching Logic Block 22 provides a first signal output representing the presence of an object or star near the "center" of the scan or "null," and a second signal output representing the presence of a star. A third signal is applied to the Error Detection System 24. The Error Detection System 24 provides a first output representative of X axis error and a second output representative of Y axis error. A pair of output signals, representing X and Y deflection are also derived from the Error Detection System 24.

A Pattern Generation System 26 includes a clock generator and counting circuits for the generation of the appropriate Track and Acquisition Scan pattern signals. A Star Presence signal from the Mode Switching Logic Block 22 enables the scan generating circuits to switch from the Acquisition Mode of operation to the Track Mode of operation.

Appropriate deflection signals for the X and Y deflection elements are applied to deflection amplifiers 28, the outputs of which are applied to the Error Detection System 24 and to the X and Y deflection elements 16, 18 of the Imaging Sensor 14. Deflection output signals are also applied to a Correcting Block 30 which provides, in the preferred embodiment, correcting signals to the X and Y vernier deflection circuits 32, 34, respectively.

In operation, the field of view available to the system is continually scanned, utilizing, in the preferred embodiment, the expanded rosette acquisition scan until a star is detected. The detection of a star is signalled by a relatively high amplitude video signal from the Video Amplifier and Filter Block 20. At the instant of star intercept or leading edge of the star, the applied video signal generates an output signal in the Mode Switching Logic Block 22 which is applied to the Error Detection System 24. The output signal, representative of the leading edge of a star representing video pulse, triggers the circuits to sample and hold the X and Y deflection signals existing at that moment, which is substantially simultaneous with the instant of star intercept. When the star is "lost," represented by the trailing edge of the star video pulse, a second sampling of the deflection signals, substantially simultaneous with the trailing edge, is made. This, too, is stored in the Error Detection System 24.

In the preferred embodiment, a second or even a third scan of the star may be required before a Star Presence signal is generated to effectuate a mode change. Each time the star is scanned, at the "leading" and "trailing" edges of the star video pulse from the video amplifier and filter block 20, the instantaneous deflection signals at the leading and trailing edges of the star pulse are sampled and held.

At the generation of a Star Presence signal, the operating mode is switched, and the sampled, averaged, X and Y deflection signals, which fairly accurately correspond to the position of the star, become the center of the tracking scan pattern. The Scan Generation System 26 applies approxiate X and Y scanning signals to the Deflection Amplifiers 28, which, in turn, apply outputs simultaneously to the deflection elements 16 and 18, and to the Error Detection System 24 and the Correction circuits of the Correcting Block 30.

During tracking, the video output of the Video Amplifier and Filter Block 20 is applied to the Error Detection System 24 to enable further sampling of the leading and trailing edges of the star at each succeeding scan. The deflection signals at each instance of star intercept and loss can be continually sampled and utilized for purposes of correction and updating.

The Scan Generation System 26 and Deflection Amplifiers 28 are then constantly "corrected" to center the tracking scan upon the star image so that the image can be followed in spite of perturbations. Should the object be "lost" that is, a complete tracking scan pattern is generated without encountering the star, the operational mode is switched back to Acquisition, and the larger area is "swept" in an attempt to regain the star.

The output of the Error Detection System 24, which in the preferred embodiment, represents the magnitude of the displacement of the star from the optical axis, may be employed in a guidance control system for the purpose of intercepting the star or remote object with the optical axis of the system.

Figure 2:
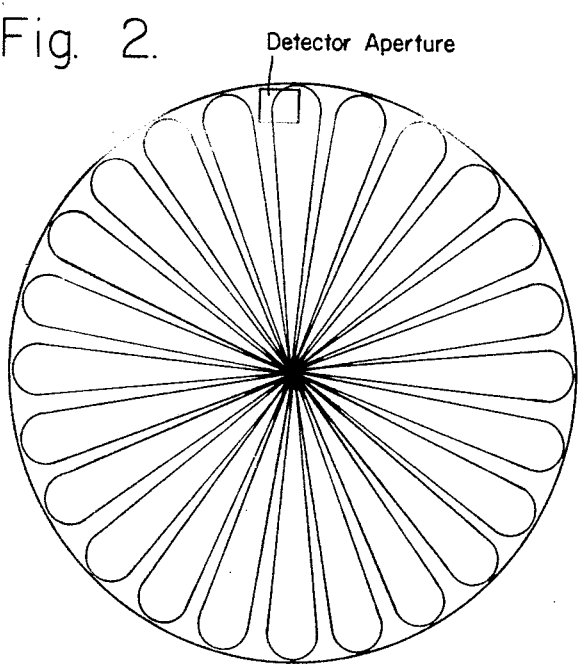
FIG. 2 is a representation of an acquisition scan pattern in the form of a rosette.

FIG. 2 is a diagram of the acquisition scan pattern generated by the center of the Imaging Sensor "aperture." Since a TV raster and a rosette scan are equally preferable, for purposes of this presentation, the preferred embodiment employs a rosette scan, which, has a plurality of petals. Obviously, the number of petals is a matter of design choice as inidcated in Equations 1 and 2, above. Because of the difficulty of illustrating such a scan, FIG. 2 must be considered as exemplary, only, of such a multipetal scan. Circuits for generating appropriate deflection signals to create such a pattern, have been disclosed in the above mentioned patent to Birnbaum and Salomon, No. 3,175,121, which taught the generation of rosette patterns on the face of a cathode ray tube. Similar circuits can be utilized herein to provide such a scan pattern. As taught in the Birnbaum et al. patent, in polar coodrinates, a rosette is generated by the equation:

$$r = A \sin n\theta \quad (3)$$

converting to cartesian coordinates, $$X = A \sin n\theta \cos \theta \quad (4)$$

$$Y = A \sin n\theta \sin \theta \quad (5)$$

The size of the rosette is a function of A while the number of petals is controlled by $2n$, if $n$ is an even integer. In one embodiment, if $\theta = 2\pi f$, $f$ was set at .3 Hz., and $nf$ was set at 19.2 Hz. The ratio of the two frequencies, $n$ equalled 64, thereby generating a rosette of 128 ($2n$) petals at a rate of .3($f$) rosettes per second.

In FIG. 3, there is a representation of the rosette pattern track scan, centered on a star image which is displaced, relative to the optical axis of the imagining sensor, here an image dissector. By comparing FIG. 3 with FIG. 2, it will be noted that the acquisition rosette scan of FIG. 2 occupies substantially the entire image dissector photocathode sensitive area, while the track scan occupies an area that is only approximately 9x the aperture area. In the acquisition scan, the image of the aperture intercepts every incremental area wherein an object may be found. When an object is detected, the operating mode changes to the track scan of FIG. 3, in which a smaller rosette of fewer peatls, scans an area centered on the point wherein the object was detected. Appropriate circuits servo the center of the scan on the centroid of the image.

In one embodiment, an image dissector Model F-4012, manufactured by IT&T, using an S-11 photocathode, with an aperture of 0.02 inch, was utilized with a rosette acquisition scan pattern of 128 petals and a .36 inch pattern diameter. The petals overlapped so that every element of the photocathode was scanned. A complete rosette was generated every 3⅓ seconds.

As shown in FIG. 3, by switching to the track scan mode of operation, a substantially smaller rosette is generated, covering a viewing area that is substantially smaller and which is not much larger than the size of the dissector aperture. The rate of rosette generation is increased, however, to some 1300 rosettes per second. Since the object can be "seen" by each rosette petal when the object center and scan center coincide, the object can be intercepted some 10,400 times per second, for quick response in the event of image movement.

The effective scan pattern in the tracking mode is best illustrated in FIG. 4, which indicates how a "square" aperture traverses the track field of view area. The dashed rosette represents the path of the center of the aperture during the scan. As the image of the object "drifts" or moves relative to the optical axis, the tracking pattern is servoed to maintain the center of the pattern on the image centroid. So long as the object image does not "slew" out of the track scan field of view between successive scan petals, the scan can lock on to the image. If the image is lost, then the acquisition scan is reinitiated.

FIG. 5 including FIGS. 5a and 5b illustrates the scanning of an aberrated star image. In FIG. 5a, the star is intercepted by a conventional X–Y scan, such as is taught in the prior Birnbaum et al. patent, No. 3,240,942.

A pulse pattern is generated corresponding to the video signal output during the scan. When the object image is "seen," a first video output signal is generated and when the image is out of view, a second video output signal is generated. If the pulse pattern is "symmetrical" with respect to a "steady state" axis, that is equal periods of first and second signals on either side of the axis, this symmetry is indicative of the fact that the center of the object is on the steady state axis. However, if the output is asymmetrical, that is, the period of first signal on one side of the axis differs from the period of first signals on the other side of the axis, then the magnitude and polarity of the asymmetry is a measure of displacement of the object from the steady state axis.

As shown and described in Birnbaum et al., above, the X–Y scan is adequate to locate an object relative to a predetermined central axis, and can provide signals corresponding to the X and Y displacement of the image from that central axis. By comparison of the output signals for symmetry, any error signal resulting when integrated, provides a steady state signal, representing relative displacement of the image. However, the basic scheme employed relies upon the assumption that the scan provides symmetrical pulse streams about an axis and that asymmetries can be processed to generate an error signal.

Most object images, and especially star image, are not perfect points, due to aberrations caused by the optical system and the intervening environment between the object and the image. As shown in FIG. 5a, an X–Y scan interacts with a star image, and depending on the orientation of the star image to the scan, the scan can center on different points on the star. Depending upon the amount and extent of interaction, substantial uncertainty can be introduced in the assumed location of the image.

As shown in FIG. 5a, with an aberrated star image, the X–Y scan finds an axis of symmetry, only with great difficulty. More probably, the system will continually "hunt" for a "center" about which the output is symmetrical.

According to the present invention, a "pulse" train video output of the scan is not analyzed to derive an "error" signal. Any scan, here a rosette scan, which is substantially nondirectional, can be used to sweep the image. Independent of the type of scan utilized, the leading edge of the viedo image pulse triggers a sampling operation which stores the deflection signals, representative of the instantaneous location of the scan at the instant of image intercept. The trailing edge of the video impulse representing the iamge also triggers a sampling of instantaneous position signals. The average value of the "leading edge" and "trailing edge" instantaneous position signals, determines the center of the star on that sweep. If a rosette pattern is used, the scan pattern center will coincide with the center of actinic radiation of the aberrated image.

As shown in FIG. 5b, each sweep of the scan results in a pair of stored deflection signals corresponding to leading and trailing edge positions. As the scan continues throughout the several petals, the stored values more closely approximate the true center of the image. The rosette type scan sweeps the image from many directions, relative to the X–Y axis, and, as a result, each produces a leading edge position, indicated by X and a trailing edge position, indicated by O. As a consequence, the orientation of the image does not affect the derivation of the image "center," which, in turn, can be used to correct the "center" of the scan pattern until the two centers coincide.

Because the rosette scan is substantially non-directional, the greater the number of petals, the more non-directional the scan becomes, relative to the star image. Further, in the present invention, the "leading edge" and the "trailing edge" deflection signals can be averaged over several scan cycles to provide a "most probable" location of the object.

Turning next to FIG. 6, there is shown a combination block and circuit diagram of a Sample and Hold Network 50, adapted to work with an imaging sensor of the image dissector type. The circuit illustrated in FIG. 6 would be connected to a one of the deflection circuits, for example, the X deflection circuit and, a substantially identical network would be provided for the Y deflection circuit, as well. The Sample and Hold Network 50 functions independent of the scanning mode and it is immaterial for purposes of discussion whether the Acquisition or Tracking Mode is operable. Further, the type of scan employed is also immaterial.

It will be noted that the network of FIG. 6 appears to be a symmetrical circuit, including a Leading Edge Sample and Hold System 52 and a Trailing Edge Sample and Hold System 52'. Inasmuch as the Leading Edge and Trailing Edge systems 52, 52' are substantially identical, prime reference numerals have been used to identify corresponding elements, and only the Leading Edge Sample and Hold circuit 52 is described in detail. However, any differences between the two circuits are noted in the following description.

The video output of the Video Amplifier and Filter Block 20 of FIG. 1 is applied as an input to both the Leading Edge and Trailing Edge Sample and Hold systems 52, 52'. This video output is applied as a trigger to a Leading Edge "One Shot" circuit 54, which generates an output sampling pulse of a duration that is short, relative to the sweep frequencies and which is preferably shorter than the duration of the video signal representing the object. More particularly, relative to the frequency used in generating the scan wave forms, the sampling pulse can be considered extremely short, so that the instantaneous X-deflection signal value may be sampled and stored.

The Leading Edge One Shot circuit 54 is triggered when the video output exceeds a predetermined threshold, representing the interception of the image of a star of greater than a preset magnitude. In the Trailing Edge Sample and Hold system 52' a corresponding, Trailing Edge "One Shot" 55 is provided, which includes additional, signal conditioning circuitry, so that it is triggered by the fall of the amplitude of the video pulse below a determined threshold, corresponding to the "trailing edge" of the star, the image of which triggered the Leading Edge One Shot 54. As with the Leading Edge One Shot 54, the Trailing Edge One Shot 55 produces an output sampling pulse, also of brief duration, that is capable of instantaneously sampling the magnitude of the X-deflection signal at the "trailing edge" of the star image.

The output of the Leading Edge One Shot 54 is applied to the base of a first gating transistor 56 and to a base bias resistor 58 which is connected to a source of common reference potential 60, indicated by the conventional ground symbol. As shown, the first gating transistor 56 is a grounded emitter NPN with its collector connected through a resistor 62 to a relatively positive reference source 64. A coupling capacitor 66 connects the collector to the gate of a first, Field Effect Transistor 68 which is connected to a relatively negative reference source 70 through a suitable resistor 72. The drains of the first Field Effect Transistors 68, 68' sample the X deflection signals.

The source of the first Field Effect Transistor 68 is connected to a Leading Edge sampling capacitor 74, and to the gate of a second Field Effect Transistor 76. The first Field Effect Transistor 68 functions as a switch while the second Field Effect Transistor 76 is connected as a proportional gate, whose output is normally controlled by the potential on the leading edge sampling capacitor 74.

The drain of the second Field Effect Transistor 76 is connected to the positive potential source 64. The source of the second Field Effect Transistor 76 is connected to the base of a second transistor 78 in this embodiment, an NPN, and through a resistor 80 to a junction 82 which is tied to the common source 60. The collector of the second transistor 78 is connected to the positive potential source 64 and the emitter, which is the output of the combination, is connected as one input to an averaging, bridge network 84.

The second input to the averaging network 84 is provided by the collector of the second gating transistor 78', of the Trailing Edge system 52'. One output of the averaging bridge 84 is applied to a system output terminal 86 and to an averaging capacitor 88, which provides a substantially continuous output, representative of the average of all of the deflection values sampled by the Leading Edge and Trailing Edge systems 52, 52'. The second output of the averaging bridge is connected, to the junction 82, and to the common source 60.

In operation, a video pulse, representing the interception of the image of a star that is greater than a predetermined magnitude, triggers the Leading Edge one shot 54 to produce a sampling pulse. The sampling pulse is applied to enable the first gating transistor 56 which, in turn, renders the first Field Effect Transistor 68 conductive for the duration of the sampling pulse.

During conduction, the first Field Effect Transistor 68 applies a voltage representative of the instantaneous X deflection signal to the Leading Edge sampling capacitor 74, charging it to the value of the X deflection. At the termination of the sampling impulse from the Leading Edge One Shot 54, the first Field Effect Transistor 68 is disabled, and the Leading Edge sampling capacitor 74 retains the sampled value until the next sampling impulse is generated by the next scan that intercepts the star image.

The Leading Edge sampling capacitor 74 controls the conduction of the combination of the second Field Effect Transistor 76 and the second transistor 78, to produce a voltage which is representative of the voltage stored on the sampling capacitor 74 and of the X deflection signal at the time of star image intercept.

As the scan continues its traverse of the star image, and the trailing edge of the image is encountered, the Trailing Edge one shot 55 generates a sampling impulse which, in similar fashion, causes the corresponding circuits, including a gating transistor 56' and a Field Effect Transistor 68', to sample the instantaneous value of the X deflection signal for storage on a Trailing Edge sampling capacitor 74'. At the conclusion of the Trailing Edge sampling pulse, a voltage signal representing the location in X of the trailing edge of the star image is applied as a second input to the averaging bridge 84.

If, for example, as a result of a leading edge sample, a 6.0 volt signal representing the location in X of the leading edge is applied to one of the bridge inputs, and, from the trailing edge sample, an 8.0 volt signal representing the location in X of the trailing edge is applied as a second input to the averaging bridge 84, then the bridge circuit 84 would generate and apply to the averaging capacitor 88, a 7.0 volt signal, as the output of the Sample and Hold network 50 representing the location, in X, of the "centroid" of the star image for this sweep. If the star image is substantially a point, then the Leading Edge and Trailing Edge sampling impulses will be substantially coincidental and accordingly, substantially the same X deflection signal will be acquired by and stored in the Leading Edge and Trailing Edge networks 52, 52'. The output of the averaging network 84 will reflect accurately the location in X of the star image.

So long as the position of the star image relative to the optical axis does not shift, each successive scan of the image will provide B representing signals that, when averaged, will closely approximate the average value stored in the averaging capacitor 88. Since, during the rosette scan, a Leading Edge intercept on one scan may be a Trailing Edge intercept on a subsequent scan, the location in X of the centroid of the star image can be ascertained with a high degree of accuracy.

Imaging sensors, generally, may utilize electrostatic or electromagnetic deflecting circuits to "scan" the image plane. In dealing with an image dissector type of imaging sensor, deflection is usually accomplished through the use of yokes which generate electromagnetic fields. Generally, the X yoke and Y yoke are to be orthogonal with respect to each other so that the X axis is orthogonal to the Y axis. However, the problem of production and fabrication of yokes usually limit orthogonality to within plus or minus 1° although plus or minus .5° non-orthogonality can be achieved on a custom basis and at much greater cost.

Turning next to FIG. 7, there is shown, schematically, a geometric diagram of the effects of yoke non-orthogonality. With control currents in the X and Y windings, the dissector aperture 102 is effectively deflected to an uncorrected location, relative to the X and Y axes 104, 106. For the purposes of this discussion, let it be assumed that the X axis 104 is taken as the reference and that the Y yoke axis 108 is then displaced from the true, orthogonal Y axis 106, by an angle, $\theta$.

The uncorrected position of the aperture 102 can be resolved into a Y deflection and an X deflection, and includes a fairly large error in X, $\Delta X$ and a much smaller error in Y, $\Delta Y$. These errors can be evaluated as functions of the angle $\theta$ as follows:

$$Y \text{ orthogonal} - Y \text{ yoke} \cos \theta \qquad (6)$$

$$\Delta Y = Y \text{ yoke} - Y \text{ yoke} \cos \theta = Y \text{ yoke} (1 - \cos \theta) \qquad (7)$$

$$\Delta X = Y \text{ yoke} \sin \theta \qquad (8)$$

Since $\theta$ is small and generally ranges between 0.5° and 1°, $\Delta Y$ will also be small, generally less than 0.35 arc-second in the "worst case" of a 1° non-orthogonality and a full $\Delta$ deflection, and therefore may be ignored. However, for completeness of disclosure, the $\Delta Y$ correction is illustrated. $\Delta X$, however, can be as much as 30 arc-seconds, in the case of a full scale Y deflection.

If the Y yoke axis 108 is rotated through the angle $\theta$ to coincide with the Y orthogonal axis 106 then the position of the aperture 102 shifts towards the Y orthogonal axis 106 by an amount equal to $\Delta X$ but should also be displaced in the Y direction by an amount $\Delta Y$. If only the X correction is made, an additional Y correction properly should be made to achieve the effect of axis rotation.

With reference now to FIG. 8, there is shown a block schematic diagram of correcting circuits, such as are included in the circuits of Correction Block 30 of FIG. 1. Shown schematically are the X main winding 16 and the Y main winding 18, together with the X vernier winding 32 and the Y vernier winding 34. The vernier windings have a smaller number of turns and are capable of deflecting the dissector aperture only by an amount equal to approximately plus or minus 1 arc minute.

The magnitude of the angle $\theta$ can be experimentally determined when the image dissector tube and the deflection yokes are assembled. A series of objects at known spatial locations relative to the optical axis can be used to calibrate the imaging sensor and to determine $\theta$. Given $\theta$, appropriate analog computing networks can be provided to generate and apply correcting currents to the vernier windings 32, 34. In the case of the X vernier winding 32, an analog multiplier 110 circuit can multiply Y by $\sin \theta$ to produce a quantity equal to $-\Delta X$ which is applied to the X vernier winding 32. The net electromagnetic deflection field produced by the simultaneous energization of the X main winding 16 by a current corresponding to X, from which is subtracted the electromagnetic deflection field produced by a current $-\Delta X$ in the X vernier winding 32 compensates electronically for the effects of Y non-orthogonality, insofar as the X deflection is concerned.

Similarly, in the Y correcting circuits, other analog computer elements 112 are interconnected to generate a signal corresponding to $\Delta Y$ which is equal to $Y(1 - \cos \theta)$, which is then applied to the Y vernier winding 34. The electromagnetic deflection field is additively combined with that produced by the Y main winding 18. Referring back to FIG. 7, it will be seen that if only the X correction is made, the Y yoke has not been effectively "rotated" to coincide with the orthogonal Y axis 106. An additional displacement in the Y direction, equal to $\Delta Y$ must be made to completely correct for the effects of non-orthogonality.

Another factor in determining overall system accuracy, is the scope and extent of the misalignment of the imaging sensor's electrical or null axis of the system. For example, the optical axis of the imaging sensor, when mounted in the environment of ultimate use, should coincide with the deflection null axis. When the sensor is "pointing" at an image on the optical axis, the image should be sensed with no deflection signals applied to the windings. Normally, the imaging sensor can be mechanically aligned to within four to five arc-seconds of the null axis by appropriate adjustment of the mounting hardware.

However, in many applications, four or five arc-seconds may be considered a gross and unacceptable error. In accordance with the present invention, electrical means are provided to coincide the null axis with the optical axis, within a fraction of an arc-second.

In the preferred embodiment, and with continued reference to FIG. 8, an X trimming potentiometer 114 is connected to a current source to apply a low level, D.C. current through the X vernier winding 32. The correcting increment can be additively combined with the above described orthogonality correction so that the signal finally applied to the X vernier winding 32 represents the algebraic sum of two corrections. Similarly, a Y trimming potentiometer 116 is provided to correct the Y deflection in a similar fashion.

During initial alignment, the imaging sensor 14 is mechanically aligned by appropriate adjustments, using a target positioned on the optical axis. No deflection signals are applied to the X and Y main windings 16, 18 and the X and Y trimming potentiometers 114, 116 are adjusted for a maximum video output signal. This correction circuitry or "boresight" correcting circuit applies a continuing correction to the imaging sensor.

From time to time, the alignment of the imaging sensor can be checked. "Gross" corrections, if necessary, can be made by adjusting the mechanical mountings, while the "fine" corrections can be made using X and Y trimming potentiometers 114, 116.

As indicated in FIG. 8, the boresight correction circuits generate signals denominated δX and δY. From the X and Y yoke currents and the predetermined value of sin $\theta$ and cos $\theta$, the orthogonality correcting signals ΔX and ΔY are generated.

Turning next to FIG. 9, including FIGS. 9a and 9b, there is illustrated in partially block, partially circuit diagrammatic fashion, a system for detecting and tracking stars, which provides output signals representative of and corresponding to the X and Y coordinates of the position of a star, relative to a predetermined coordinate system centered on an optical, pointing axis. The system of FIG. 9 utilizes a rosette scan for both acquisition and tracking and illustrates, in greater detail than the foregoing figures, a system according to the present invention.

As shown, the system has been subdivided into a plurality of sub-systems, each packaged as a "module" or a portion of a module. Module 1, 120 (shown in FIG. 9a) contains the elements of the Video Amplifier and Filter Block 20, and the Error Detector System 24 of FIG. 1. The remaining modules are shown in FIG. 9b. Module 2, 122 includes the Mode Switching Logic 22 and time delay circuits for maintaining the system in one or the other of the operating modes for preset timed intervals. Module 3, 124, includes the clock, and sweep generating and wave forming circuitry of the Scan Generation System 26. Module 4, 126, contains Integrators which integrate error signals and cause the track scan pattern to center on the star image, analog adders for combining the track scan pattern with the error signals and also the Deflection Amplifiers 28.

The individual circuit elements of the preferred embodiment have been selected from commercially available circuits. Using well known logical design techniques, equivalent circuits, utilizing different elements, could be constructed to perform substantially in the same fashion. Therefore, the following description, while based upon the use of components available from a single manufacturer, is not so limited, and it is within the skill of the art to modify the logical design to utilize any other components, without departing from the invention.

Turning first to Module 1, 120 (FIG. 9a), the inputs to this module are derived from the Imaging Sensor 14 output and from a Mode Select signal line from Module 2, 122. Module 1, 120, provides, as output signals, the X and Y signals which are derived from samples of the deflection signals generated in Module 4, 126.

The imaging sensor output is applied to an Acquisition Analog Gate 130, and to a Track Analog Gate 132. The first and second Analog Gates are selectively enabled by a Dual Gate 134, which receives a control signal from the Star Presence Detector of Module 2, 122.

The so-called "Dual Gate" is, in the preferred embodiment, a commercially available, dual two-input gate element, which is a combination of two, two-input resistor-transistor-logic circuits, permitting the generation of any logic function through the use of such dual two-input gate elements. As supplied by the manufacturer, and assuming the inputs are represented by A and B, if positive logic is used, the gates mechanize the logical function, $\overline{A} \cdot \overline{B}$. Using negative logic, the gate mechanizes the $\overline{A} + \overline{B}$ function. By appropriate interconnection of the various terminals of the circuit, the dual, two-input gate element circuit, may be cross connected to form a flip-flop, or, if in tandem, non-inverting gates.

Accordingly, the first Dual Gate 134, in response to a first signal input, enables the Acquisition Analog Gate 130, and, in response to a second signal input, enables the Track Analog Gate 132.

A pair of Detection Filter Amplifier circuits 137, 136 are respectively connected to the outputs of the Acquisition and Track analog gates 130, 132. The outputs of the Detection Filter Amplifiers 137, 136, are commonly connected to a Threshold Detector 138 which has, as a second input, an adjustable reference voltage source 139 for establishing the minimum image intensity that can be distinguished by the imaging sensor 14.

The output of the Threshold Detector 138 is applied to the Star Presence Detector of Module 2, 122 and to a Buffer Inverter element 140.

The Buffer Inverter element 140 provides an output signal on a first line when the "leading edge" of a star pulse is encountered, and an output on a second line when the "trailing edge" of a star pulse is encountered. The Leading Edge Signal is applied to a Leading Edge One Shot 142 and the Trailing Edge signal is applied to a Trailing Edge One Shot 144.

As explained above, in connection with FIG. 6, Error Detection Sample and Hold circuits 145, 145' are provided, here indicated in block-diagrammatic form, which can be mechanized by utilizing two of the Error Detection Sample and Hold circuits 50 of FIG. 6, one of the X deflection signals and one for the Y deflection signals.

Signals from the X and Y deflection yokes 16, 18 are applied as energizing inputs to the Sample and Hold circuits 145, 145'. As an output, the Sample and Hold networks 145, 145' provide signals corresponding to the "average" location in X and Y that correspond to the "centroid" of the star.

Turning next to FIG. 9b, in Module 2, 122, the output of the Threshold Detector 138 is applied to an appropriate Buffer and Time Delay circuit 146 in Module 2, 122, which, if enabled for greater than a predetermined interval, signals the presence of a star. A second buffer and time delay circuit 148 provides the signal that initiates a mode change from the Acquisition Mode to the Tracking Mode.

A Track signal is generated which is applied to the first Dual Gate 134 to disable the Acquisition Analog Gate 130 and to enable the track Analog Gate 132. The Mode Change signal is also applied to a Frequency Selecting Circuit 150, which receives as its input, selected signals from Module 3, 124. In Module 3, 124, a clock gate 152, and counter circuit 154, provide output signals at a first "chopping" frequency of 19.2 Hz. for generating the Acquisition Scan pattern, and at a second "chopping" frequency of 1.2 Hz., for generating the Tracking Scan pattern. Through the use of a clock 152 and binary counter 154 combination, a starting frequency here of 19.2 Hz. is divided down to .3 Hz. which is derived from the "last stage" 156. An additional "last" stage 158 is provided to generate a second .3 Hz. signal that is effectively 90° out-of-phase, whereby one of the signals represents a "sine" function and the other, a "cosine" function.

The "sine" representing output is applied to a first Chopper 160 and the "cosine" output is applied to a second Chopper 162. The 1.2 and 19.2 Hz. input signals are also applied to the first and second choppers 160, 162. Depending upon the operating mode in effect, either the 1.2 Hz. or 19.2 Hz. frequency will be "chopped" in the first and second choppers 160, 162, which effectively multiplies the selected frequency by the sine and cosine signals respectively, thereby generating the rosette.

The signal output of the first and second choppers 160, 162 is applied to an Acquisition dual gate 164 and to a Track duel gate 166. A Mode Change dual gate 168, driven by the output of the Mode Changing circuits in Module 2, 122, selectively enables the Acquisition dual gate 164 or the Track dual gate 166 as a function of the operating mode.

The Acquisition and Track dual gates 164, 166, provide, on separate output lines, the first and second chopper signals which become, respectively, the X and Y deflection signals. These are applied to appropriate acquisition and track filter amplifiers 170, 172, 174, 176, which select, from the applied composite frequency signals, signals appropriate for the generation of the rosette.

X and Y acquisition filters 170, 172, and similarly an

X Track and Y Track filter 174, 176, are provided. The X outputs are commonly applied to an X Adder Amplifier 178 and the Y outputs are commonly applied to a Y Adder Amplifier 180. The X and Y Adder Amplifiers 178, 180, apply their signals to an X and Y Analog Adder circuit 182, 184.

A second input to the X and Y Adders 182, 184, comes from the output of the Sample and Hold networks 145, 145' and represents the average X and Y signals. These are respectively applied to X and Y Integrators 186, 188, the outputs of which are combined with the outputs of the X and Y Adder Amplifiers 178, 180 in the X and Y Adders 182, 184.

The X and Y integrators 186, 188, are controlled by a dump gate 189 which is enabled by a track signal from the second buffer time delay 148.

The output of the X and Y Adders 182, 184, are respectively applied to the X and Y Yoke drivers 190, 192, whose outputs respectively drive the X and Y Yokes 16, 18 (of FIG. 1). The X and Y integrators 186, 188, also apply output signals to an X and Y output amplifiers 196, 198.

In operation, the clock 150 and the binary counter chain 154 generate the rosette scan equation:

$$X = A \sin n\theta \cos \theta \quad (4)$$

$$Y = A \sin n\theta \sin \theta \quad (5)$$

A square wave is an adequate approximation of a sine wave for purposes of frequency multiplication.

The square wave representing $\sin n\theta$ is taken from the clock 150 for use in the acquisition mode while the square wave representing $\sin n\theta$ for the tracking mode is taken from the next to last stage of the binary chain 154. The $\sin \theta$ and $\cos \theta$ representing wave trains are derived from the appropriate binaries 156 and 158, which are 90° out of phase with each other.

The square wave train representing the X and Y values are applied through appropriate filters, adders, and amplifiers to an integrator circuit which generates ramp wave forms that are applied to the X and Y yoke drivers 190, 192. When in the Acquisition mode, the scan pattern is centered on the optical axis, and each elemental area of the field of view is "seen" by the imaging sensor.

When a star is detected, a video signal is generated which, in turn triggers the leading and trailing edge one shots 142, 144. The instantaneous values of X and Y deflection are sampled and held at the leading and trailing edges of the star. However, these values do not affect the scan until the star recognition circuits of Module 2, 122 provide a mode change signal.

Other applications of the system of the present invention might include, for example, star mapping or, off-axis tracking where the object is displaced from the optical axis by predetermined amounts. Assuming that similar problems of non-orthogonal yokes, as discussed in connection with FIGS. 6 and 7, above, exist, before the yoke currents can be used as indications of X and Y coordinates of the star image, compensating corrections must be made to the yoke currents so that the magnitudes are directly related to the object location in space.

Turning now to FIG. 10, assuming that the yokes were orthogonal, the assumed star position 202 could be determined from the X and Y yoke current values, represented by displacements X uncorrected 204, and Y uncorrected 206. Since the amount of non-orthogonality can be ascertained as explained above, a simple correction can be made according to the following equations:

$$Y \text{ uncorrected } \cos \theta = Y \text{ orthogonal} \quad (9)$$

$$Y \text{ uncorrected } \sin \theta = \Delta X \quad (10)$$

$$X \text{ uncorrected} + \Delta X = X \text{ orthogonal} \quad (11)$$

$$X \text{ uncorrected} + Y \text{ uncorrected } \sin \theta = X \text{ orthogonal} \quad (12)$$

Since yoke non-orthogonality ($\theta$) can be held to less than 1°, cosine 1° equals .99985 and, therefore, the measured Y value can be safely assumed to be the orthogonal value, since only a negligible error is introduced by the assumption. However, in the case of $\Delta X$, sine of 1° is equal to .01745, which, in the case of even a 1° deflection, would represent almost 63 arc-seconds of error.

As in the example of FIG. 7, above, the true position of the star 208, can be derived, if the value of X is corrected. By applying the Y deflection voltage and a fixed quantity, corresponding to $\sin \theta$, to an analog multiplier, a quantity equal to $\Delta X$ is generated. In the absence of a vernier winding, $\Delta X$ is then added to the uncorrected value of X to produce a corrected signal output.

In the embodiments of FIGS. 7 and 8, above, the imaging sensor was electrically corrected to compensate for non-orthogonality, but use of the vernier windings so that signals applied to the main windings were truly representative of star position. In the present embodiment, the main winding signal includes an error that is corrected for in the signal processing circuits.

Turning next to FIG. 11, there is shown in block circuit diagram, correcting circuitry 210 suitable for use in deriving a True X and Y output signal from an imaging sensor having non-orthogonal yokes. In FIG. 11, the Y signal from the main winding is applied to an analog multiplier 212 which multiplies Y by $\cos \theta$. This is strictly an optional operation, in that, for small values of $\theta$, the value of $\cos \theta$ is substantially equal to 1, in which case a negligible correction is made to Y. The Y signal is applied to an amplifier 214 and to a Y True Output Terminal 216.

The Y signal is also applied to a second analog multiplier 218, which multiplies Y by $\sin \theta$, the output of which is applied to an adder 220, that additively combines the X deflection signal with the Y $\sin \theta$ signal. The combined signal is applied through an amplifier 222 to produce a True X output signal at an X terminal 224. These True X and Y signals can be utilized for guidance, control, mapping or locating objects in spatial coordinates.

Turning next to FIG. 12, there is shown an alternative scan pattern which can be used in the systems of the present invention. The scan of FIG. 12 may be termed a "TV" scan and is basically a horizontal, linear scan, with an incremental change in the vertical deflection after each horizontal scan. This type of scan provides the longest "dwell" time on each image element for a given "frame time." Accordingly, this scan might be preferable to the rosette in some applications. The "TV" type scan is most useful in an acquisition scan, and may be used in conjunction with either a smaller "TV" scan or rosette scan for tracking. Suitable circuits for generating TV type scans are well known in the art and need not be described herein.

As in the preferred embodiment, the X and Y deflection signals at the leading and trailing edges of the star image can be held as a "center" for the tracking scan. Suitable delay circuits may permit several scans during acquisition to permit an "averaged" X and Y value. Clearly, care must be taken that only one star of sufficient magnitude or brightness is in the field of scan to prevent confusion of the system in the event that multiple scans are permitted before mode change over to track.

While the present invention has been described primarily in the context oi a startracker, it will be apparent that other systems can usefully employ the inventions. For example, radar, sonar or other object locating systems employ locating mechanisms which signal where, relative to a predetermined axis, the system is "pointing" at any instant of time and it is the correlation of the "pointing" location and the signal indicative of a target that permits the location of a target.

The techniques of the present invention can easily be adopted in such systems and the signals representing the "pointing location" can be sampled at the "leading edge" and trailing edge of the target-indicating signal to provide a more accurate indication of the location of the centroid of the target.

Accordingly, the scope of the invention should be limited only by the scope of the appended claims.

What is claimed as new is:

1. In an object locating system in which the presence of an object is indicated by a first signal and the location of the object, relative to a predetermined spatial reference, is derived from second signals representing the location of the object with respect to the predetermined spatial reference, the combination comprising:
   (a) first sampling means connected to receive the first and second signals for storing the instantaneous values of the second signals in response to and coincident with the leading edge of the first signal;
   (b) second sampling means connected to receive the first and second signals for storing the instantaneous values of the second signals in response to and coincident with the trailing edge of the first signal; and
   (c) output means connected to said first and second sampling means for receiving said leading edge and trailing edge values of said second signals and for generating composite output signals representing the relative location of the object whose presence was signalled by the corresponding first signal.

2. The apparatus of claim 1, wherein said output means include averaging means for averaging said leading edge and trailing edge values of the second signals to provide said composite output signals.

3. Apparatus of claim 1, wherein the second signals include a first coordinate representing signal and a second coordinate representing signal, the first and second coordinates defining a reference plane, said first sampling means further including means for storing instantaneous values of the first coordinate representing signals and second coordinate representing signals in response to and coincident with the first signal leading edge, and said second sampling means further including means for storing instantaneous values of the second coordinate representing signals in response to and coincident with the first signal trailing edge, and wherein said output means combines leading edge and trailing edge first coordinate representing signals to provide a first composite output signal, and said output means combines leading edge and trailing edge second coordinate representing signals to provide a second composite output signal, whereby said first and second composite output signals represent a unique location in the reference plane, corresponding to the location of the centroid of the object whose presence was indicated by the first signal.

4. Apparatus of claim 3, wherein a polar coordinate system defines the referenced plane and wherein the coordinate representing signals define the relative location of the object, expressed in polar coordinates.

5. Apparatus of claim 3, wherein a cartesian coordinate system defines the reference plane and wherein the coordinate representing signals define the relative location of the object, expressed in cartesian coordinates.

6. Apparatus of claim 1, wherein the system includes an imaging sensor for providing first and second deflection signals defining displacement from a predetermined sensor point of reference;
   said first signals corresponding to video signals representative of an object;
   said first sampling means storing leading edge deflection signals and said second sampling means storing trailing edge deflection signals; and
   said composite output signals including a first composite deflection signal and a second composite deflection signal for uniquely defining the location of the object relative to the predetermined sensor point of reference.

7. In a system for detecting and signalling the relative location of a spatially remote object, including apparatus for providing output signals corresponding to and representative of object location, the combination comprising:
   (a) imaging sensor means adapted to scan a predetermined field of view and having first and second deflection means operable in response to applied first and second deflection signals to scan an incremental area whose spatial location is uniquely identified by the polarity and magnitude of the applied first and second signals, said imaging sensor further including means to provide a first video output signal representing an object in the incremental area being scanned;
   (b) sampling means connected to receive said first video output signal for generating first and second sampling impulses from each video output signal, said sampling impulses being brief, relative to the interval required to scan an object, said first sampling impulse substantially coinciding in time with the leading edge of a first video output signal, and said second sampling impulse substantially coinciding in time with the trailing edge of a first video output signal; and
   (c) signal storage means connected to said sampling means and said imaging sensor means including leading edge storage means responsive to said first sampling impulses for sampling and storing the instantaneous coincidental values of the first and second deflection signals, and trailing edge storage means responsive to said second sampling impulses for sampling and storing the instantaneous coincidental values of the first and second deflection signals,
       whereby first and second deflection signals corresponding to and representative of the location of the "leading edge" of an object and first and second deflection signals corresponding to and representative of the trailing edge of the same object are stored to provide signals from which a representation of the location of the object can be derived.

8. Apparatus of claim 7, above, further including averaging means coupled to said signal storage means for providing first and second output signals, respectively representative of the average of said stored leading edge and trailing edge first deflection signals and the average of said leading edge and trailing edge second deflection signal to define an average location for the object based on the leading edge and trailing edge locations.

9. Apparatus of claim 7, above, further including means coupled to said imaging sensor means for cyclically scanning the predetermined field of view, said signal storing means being adapted to store and average successive leading edge first and second deflection signals and trailing edge first and second deflection signals corresponding to object leading and trailing edge locations on successive scans, for continuously providing first and second output signals representative of object location.

10. Apparatus of claim 9, above, further including averaging means coupled to said signal storing means for receiving leading edge and trailing edge first deffection signals to generate said first output signals representative of averaged first deflection signals and for receiving leading edge and trailing edge second deflection signals to generate said second output signals representative of averaged second deflection signals.

11. The apparatus of claim 7, wherein said imaging sensor means include an optical pointing axis and substantially orthogonal deflecting circuits, for establishing a deflection axis, further including apparatus for correcting for non-orthogonality of imaging sensor deflecting circuits and for coinciding the optical and deflection axes comprising:
   signal processing means connected to the deflecting circuits to receive deflecting signals for generating correcting signals representing a predetermined trigometric function of measured non-orthogonality and applied deflecting signals, and means for applying said corercting signals to the deflecting circuits, whereby correcting signals derived from applied deflecting signals are fed back to the deflecting circuits to provide dynamic compensation for errors resulting from non-orthogonality.

12. Apparatus as in claim 11, above, further including vernier deflecting means adjacent the deflecting circuits, said signal processing means being connected to apply said correcting signals to said vernier deflecting means, whereby correcting deflecting forces are generated to compensate deflecting forces for errors resulting from non-orthogonality.

13. Apparatus as in claim 11, above, further including alignment means adapted to provide an alignment signal to the deflecting circuits for coinciding the optical and deflection axes in the absence of deflection signals.

14. Apparatus as in claim 12, above, further including adjustable alignment means adapted to generate an alignment signal, means coupling said alignment means to said vernier deflecting means whereby said alignment means provides deflection forces to coincide the optical and deflection axes in the absence of deflection signals.

15. In an object locating system including an imaging sensor adapted to provide object signals and having a deflection axis corresponding to a system pointing axis and deflection means for providing deflection signals corresponding to and representative of displacement of an object relative to the deflection axis, means for acquiring and tracking remote objects comprising:

scanning means having an acquisition mode of operation and a tracking mode of operation, connected to the imaging sensor and to the deflection means for generating, in the acquisition mode, first scanning deflection signals to cyclically scan the imaging sensor field of view in a pattern indexed to the deflection axis, and for generating, in the tracking mode, second scanning deflection signals to cyclically scan a limited area of the imaging sensor field of view in a pattern indexed to a location defined by applied stored deflection signals;

location defining means connected to the imaging sensor and operable in response to applied object signals for sampling and holding the deflection signals coinciding in time with applied object signals as stored deflection signals, and if in the acquisition mode, for generating acquisition signals;

scan switching means connected to said location defining means and said scanning means, and operable in response to applied acquisition signals for changing the mode of operation from acquisition to tracking, and for applying stored deflection signals to said scanning means to index the tracking scan, whereby objects within the imaging sensor field of view are detected and the location of the object relative to the field of view deflection axis, becomes the basis of a more limited, tracking scan.

16. Apparatus as in claim 15, above, wherein said location defining means is operable in the tracking mode, to generate object loss signals in response to a predetermined number of cyclical scans without receipt of an applied object signal from the imaging sensor, said switching means being operable in response to applied object loss signals for changing the mode of operation from tracking to acquisition.

17. Apparatus of claim 16, above, wherein said location defining means, in the tracking mode, continually corrects the stored deflection signals to represent the object location during each scan during which an object signal is applied by the imaging sensor, whereby the index of the tracking scan is continuously modified to represent the most recent location of the object, relative to the deflection axis.

18. Apparatus of claim 17, above, wherein said acquisition scan is centered on the deflection axis and said tracking scan is centered upon the object location.

References Cited

UNITED STATES PATENTS

| 3,010,024 | 11/1961 | Barnett et al. | |
| 3,372,266 | 3/1968 | Chilton et al. | 250—203 X |
| 3,398,284 | 8/1968 | Stakun. | |
| 3,419,674 | 12/1968 | Burns et al. | 250—203 X |
| 3,433,895 | 3/1969 | Malkiel | 178—7.2 |

RALPH G. NILSON, Primary Examiner

C. M. LEEDOM, Assistant Examiner

U.S. Cl. X.R.

178—7.2; 250—203